(12) United States Patent
Ishibashi et al.

(10) Patent No.: US 12,054,024 B2
(45) Date of Patent: Aug. 6, 2024

(54) UTILITY VEHICLE

(71) Applicant: KAWASAKI MOTORS, LTD., Akashi (JP)

(72) Inventors: Kazuki Ishibashi, Kobe (JP); Yumi Miyake, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 848 days.

(21) Appl. No.: 16/750,600

(22) Filed: Jan. 23, 2020

(65) Prior Publication Data

US 2021/0229517 A1 Jul. 29, 2021

(51) Int. Cl.
*B60G 17/0165* (2006.01)
*B62D 5/04* (2006.01)
*B60R 16/00* (2006.01)
*B60R 16/02* (2006.01)
*B60R 16/03* (2006.01)

(52) U.S. Cl.
CPC ....... *B60G 17/0165* (2013.01); *B62D 5/0409* (2013.01); *B60G 2202/42* (2013.01); *B60G 2300/00* (2013.01); *B60G 2600/73* (2013.01); *B60R 16/005* (2013.01); *B60R 16/02* (2013.01); *B60R 16/0207* (2013.01); *B60R 16/03* (2013.01)

(58) Field of Classification Search
CPC ............ B60G 17/0165; B60G 2202/42; B60G 2600/73; B62D 5/0409; B60R 16/03
USPC ........................................................ 701/37
See application file for complete search history.

(56) References Cited

U.S. PATENT DOCUMENTS

| 5,327,989 | A | * | 7/1994 | Furuhashi | ............ | B60K 17/165 |
| | | | | | | 180/908 |
| 5,739,592 | A | * | 4/1998 | Rigsby | ..................... | B60D 1/62 |
| | | | | | | 701/32.7 |
| 8,613,336 | B2 | | 12/2013 | Deckard et al. | | |
| 2005/0161891 | A1 | * | 7/2005 | Trudeau | ............... | B60G 17/018 |
| | | | | | | 280/6.155 |
| 2009/0112402 | A1 | * | 4/2009 | Furuichi | ............... | B60G 17/016 |
| | | | | | | 701/37 |
| 2015/0047917 | A1 | * | 2/2015 | Burt, II | .................. | B60K 15/04 |
| | | | | | | 180/68.5 |
| 2018/0048801 | A1 | * | 2/2018 | Kiser | .................. | H04N 5/23238 |
| 2018/0194286 | A1 | * | 7/2018 | Stein | ..................... | B60W 10/22 |
| 2020/0384980 | A1 | * | 12/2020 | Yu | ........................ | G05D 1/0223 |

OTHER PUBLICATIONS

Kia Stinger K8 2018-2021 Electronic Suspension Controller Access Pics, downloaded from: https://www.k8stingerstore.com/products/mando-ecs 10#gallery-12 (Year: 2018).*

* cited by examiner

*Primary Examiner* — Jacob S. Scott
*Assistant Examiner* — Michael E Butler
(74) *Attorney, Agent, or Firm* — Alleman Hall & Tuttle LLP (57) ABSTRACT

A utility vehicle includes an electronic control unit configured to control electronically controlled suspension devices. The electronic control unit is disposed in an internal space formed between a front panel and a dash panel and is located at a higher level than a seat portion of a driver seat. In a vehicle width direction, the electronic control unit is located toward a driver seat region of the dash panel with respect to a center region of the dash panel.

11 Claims, 6 Drawing Sheets

UTILITY VEHICLE

BACKGROUND OF THE INVENTION

Field of the Invention

The present disclosure relates to a utility vehicle configured to travel on uneven terrains.

Description of the Related Art

U.S. Pat. No. 8,613,336 discloses a utility vehicle configured to travel on uneven terrains. One possible approach for improving the ride comfort of such a utility vehicle is to use an electronically controlled suspension.

When an electronically controlled suspension is used in a utility vehicle, careful consideration needs to be given to how to arrange an electronic control unit (ECU) for control of the suspension. For example, when the utility vehicle is traveling on a bad road, the utility vehicle may enter a pool of water, and its vehicle body may be immersed in water. Additionally, the electronic control unit emits heat, and it is desired to prevent the heat from causing the occupant to feel discomfort. Further, the utility vehicle is equipped with accessories, and it is desired to prevent the flexibility in arranging the accessories from being reduced due to the influence of the provision of the electronic control unit. Moreover, the electronic control unit is desirably mounted at a location such that the electronic control unit is protected from splashing mud, flying stones, and the like.

SUMMARY OF THE INVENTION

A utility vehicle according to one aspect of the present disclosure includes: a pair of front wheels; a pair of rear wheels; a vehicle body frame supported by the pair of front wheels and the pair of rear wheels; a driver seat supported by the vehicle body frame; a passenger seat supported by the vehicle body frame; a front panel separating a vehicle exterior space formed between the pair of front wheels from a vehicle interior space in which the driver seat and the passenger seat are disposed; a dash panel disposed rearward of the front panel and forward of the driver seat and the passenger seat, the dash panel including a driver seat region opposed to the driver seat, a passenger seat region opposed to the passenger seat, and a center region disposed between the driver seat region and the passenger seat region; a handle device including a steering shaft penetrating the driver seat region of the dash panel in a vehicle front-rear direction and a steering wheel connected to a rear end of the steering shaft; at least one pair of electronically controlled suspension devices connecting at least the pair of front wheels or the pair of rear wheels to the vehicle body frame; and an electronic control unit configured to control the electronically controlled suspension devices, wherein the electronic control unit is disposed in an internal space formed between the front panel and the dash panel and is located at a higher level than a seat portion of the driver seat, and in a vehicle width direction, the electronic control unit is located toward the driver seat region with respect to the center region.

With the above configuration, when the utility vehicle traveling on a bad road is immersed in water, the water can be prevented from reaching the electronic control unit. Additionally, since the electronic control unit is disposed in front of the driver seat region, reduction in the flexibility in arranging the accessories (such as audio equipment, a display, a heater device, and a glove box) in the passenger seat region and center region of the dash panel can be prevented. Further, since the electronic control unit is disposed in the internal space formed between the front panel and the dash panel, the electronic control unit can be protected from splashing mud, flying stones, and the like.

A utility vehicle according to another aspect of the present disclosure includes: a pair of front wheels; a pair of rear wheels; a vehicle body frame supported by the pair of front wheels and the pair of rear wheels; a driver seat supported by the vehicle body frame; a passenger seat supported by the vehicle body frame; a front panel separating a vehicle exterior space formed between the pair of front wheels from a vehicle interior space in which the driver seat and the passenger seat are disposed; a dash panel disposed rearward of the front panel and forward of the driver seat and the passenger seat, the dash panel including a driver seat region opposed to the driver seat, a passenger seat region opposed to the passenger seat, and a center region disposed between the driver seat region and the passenger seat region; a handle device including a steering shaft penetrating the driver seat region of the dash panel in a vehicle front-rear direction and a steering wheel connected to a rear end of the steering shaft; at least one pair of electronically controlled suspension devices connecting at least the pair of front wheels or the pair of rear wheels to the vehicle body frame; and an electronic control unit configured to control the electronically controlled suspension devices, wherein the electronic control unit is disposed in an internal space formed between the front panel and the dash panel, and the electronic control unit is disposed such that a thickness direction of the electronic control unit extends in the vehicle front-rear direction.

With the above configuration, when the utility vehicle traveling on a bad road is immersed in water, the water can be prevented from reaching the electronic control unit. At the same time, the occupant can be prevented from feeling discomfort due to heat emitted from the electronic control unit. Additionally, since the electronic control unit is disposed in the internal space formed between the front panel and the dash panel, the electronic control unit can be protected from splashing mud, flying stones, and the like. Further, since the thickness direction of the electronic control unit extends in the vehicle front-rear direction, the distances from the front panel and dash panel to the electronic control unit can be made large. This makes it possible to reduce the likelihood that the front panel or dash panel contacts the electronic control unit when subjected to and deformed by an external impact.

A utility vehicle according to yet another aspect of the present disclosure includes: a pair of front wheels; a pair of rear wheels; a vehicle body frame supported by the pair of front wheels and the pair of rear wheels; a driver seat supported by the vehicle body frame; a passenger seat supported by the vehicle body frame; a front panel separating a vehicle exterior space formed between the pair of front wheels from a vehicle interior space in which the driver seat and the passenger seat are disposed; a dash panel disposed rearward of the front panel and forward of the driver seat and the passenger seat, the dash panel including a driver seat region opposed to the driver seat, a passenger seat region opposed to the passenger seat, and a center region disposed between the driver seat region and the passenger seat region; a handle device including a steering shaft penetrating the driver seat region of the dash panel in a vehicle front-rear direction and a steering wheel connected to a rear end of the steering shaft; at least one pair of electronically controlled suspension devices connecting at least the pair of front wheels or the pair of rear wheels to the vehicle body frame; and an electronic control unit configured to control the electronically controlled suspension devices, wherein the electronic control unit is located at a higher level than a seat portion of the driver seat.

With the above configuration, when the utility vehicle traveling on a bad road is immersed in water, the water can be prevented from reaching the electronic control unit.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, an embodiment will be described with reference to the drawings.

Figure 1:
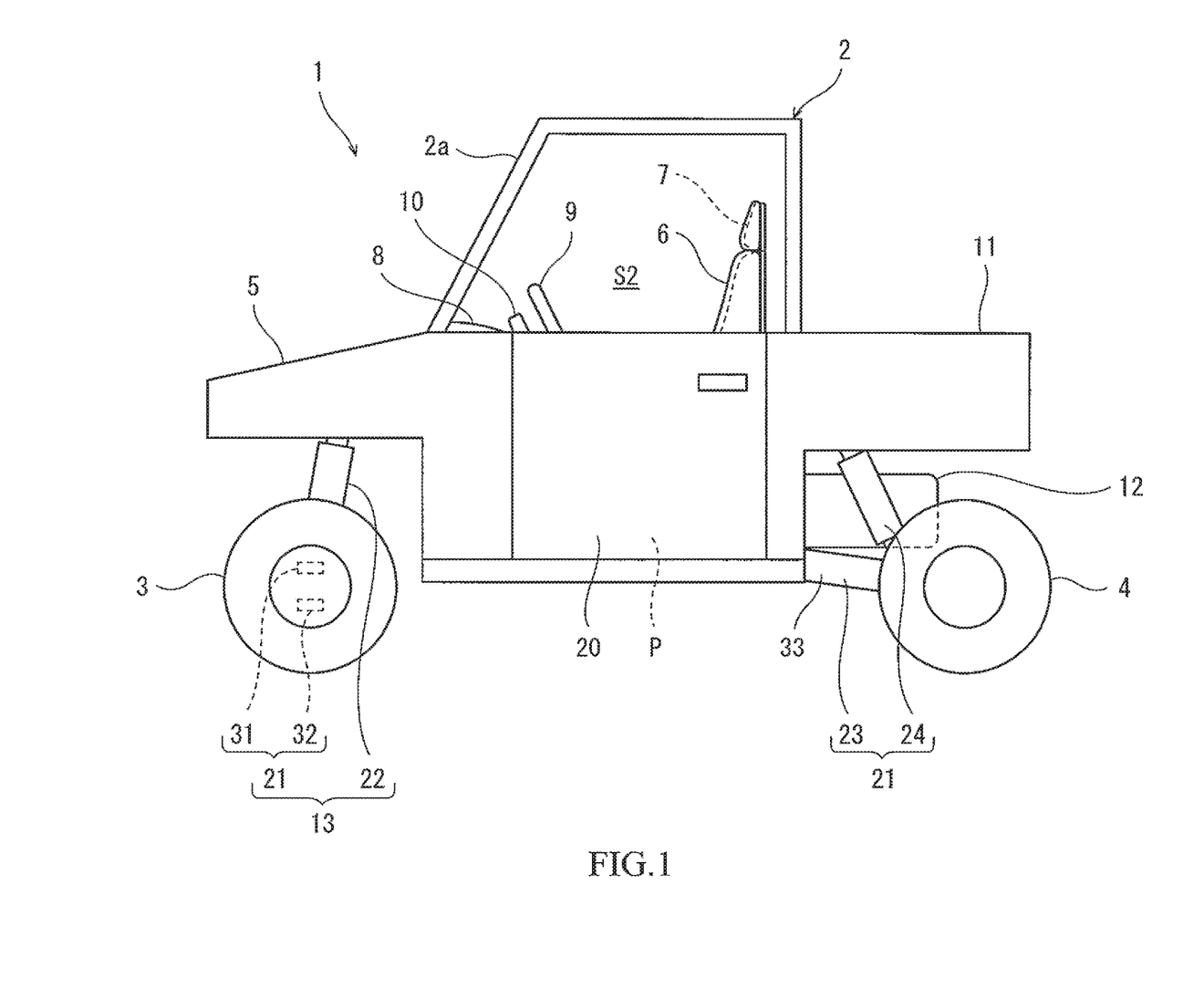
FIG. 1 is a left side view schematically showing a utility vehicle according to an embodiment.

FIG. 1 is a left side view schematically showing a utility vehicle 1 according to the embodiment. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. The tires of the front and rear wheels 3 and 4 are balloon tires for travel on uneven terrains. The space between the left and right front wheels 3 is covered from above by a hood 5 made of resin. A driver seat 6 and a passenger seat 7 supported by the vehicle body frame 2 are disposed rearward of the hood 5 and arranged side-by-side. The utility vehicle 1 is designed on the assumption that it may be immersed in water during travel to the extent that the water level reaches the vicinity of a seat portion 6a of the driver seat 6. For example, intake and exhaust ports of an engine mounted in the vehicle body frame 2 may be located at a higher level than the seat portion 6a of the driver seat 6 in order to prevent water entry into the engine.

The vehicle body frame 2 is a pipe frame constituted by a plurality of pipes connected together. The vehicle body frame 2 includes a cabin frame 2a surrounding a vehicle interior space S2 in which the driver seat 6 and the passenger seat 7 are disposed. On the left of the driver seat 6 there is provided a driver seat-side boarding opening P closable by a side door 20. Likewise, on the right of the passenger seat 7 there is provided a passenger seat-side boarding opening closable by a side door. To get on the vehicle, the driver opens the side door 20, enters the vehicle interior space S2 through the driver seat-side boarding opening P, and sits on the driver seat 6. The vehicle interior space S2 surrounded by the cabin frame 2a is exposed to the outside environment. A dash panel 8 is disposed forward of the driver seat 6 and the passenger seat 7. The dash panel 8 is provided with a handle device 9 projecting toward the driver seat 6.

The handle device 9 includes a steering shaft 9a penetrating the dash panel 8 in the vehicle front-rear direction and a steering wheel 9b connected to a rear end of the steering shaft 9a. A display device 10 that displays the vehicle velocity etc. is disposed between the dash panel 8 and the steering wheel 9b. The display device 10 may be embedded in the dash panel 8.

A loading bed 11 forming a recessed load-carrying space open to the outside environment is provided rearward of the cabin frame 2a. A power unit 12 is mounted below the loading bed 11. The power unit 12 includes an engine configured as an internal combustion engine and a continuously variable transmission configured to change the speed of rotational power output from the engine. An electric motor may be used as a prime mover instead of the engine. The power unit 12 generates rotational power for driving drive wheels. When the utility vehicle 1 is a two-wheel-drive vehicle, the rear wheels 4 are the drive wheels. When the utility vehicle 1 is a four-wheel-drive vehicle, the front and rear wheels 3 and 4 are the drive wheels.

Each of the pair of front wheels 3 is connected to the vehicle body frame 2 via a front electronically controlled suspension device 13. The front electronically controlled suspension device 13 includes a front arm mechanism 21 and a front shock absorber 22. The front arm mechanism 21 connects the front wheel 3 to the vehicle body frame 2 such that the front wheel 3 is movable upward and downward relative to the vehicle body frame 2. Specifically, the front arm mechanism 21 includes an upper A-arm 31 and a lower A-arm 32 disposed below the upper A-arm 31.

The front shock absorber 22 has spring properties and damper properties and connects the front arm mechanism 21 to the vehicle body frame 2. The front shock absorber 22 is a known active shock absorber. Active shock absorbers are configured such that their extension-compression stroke and/or damping coefficient is variable by electronic control. In an example, the front shock absorber 22 is configured such that its damping coefficient is variable by electronic control. Specifically, the damping coefficient is varied by actuating a solenoid valve (not illustrated) of the front shock absorber 22.

Each of the pair of rear wheels 4 is connected to the vehicle body frame 2 via a rear electronically controlled suspension device 14. The rear electronically controlled suspension device 14 includes a rear arm mechanism 23 and a rear shock absorber 24. The rear arm mechanism 23 connects the rear wheel 4 to the vehicle body frame 2 such that the rear wheel 4 is movable upward and downward relative to the vehicle body frame 2. Specifically, the rear arm mechanism 23 includes a trailing arm 33 extending in the front-rear direction.

The rear shock absorber 24 has spring properties and damper properties and connects the rear arm mechanism 23 to the vehicle body frame 2. Similarly to the front shock absorber 22, the rear shock absorber 24 is a known active shock absorber. Active shock absorbers are configured such that their extension-compression stroke and/or damping coefficient is variable by electronic control. In an example, the rear shock absorber 24 is configured such that its damping coefficient is variable by electronic control. The electronically controlled suspension may be employed only in the front suspension or rear suspension.

Figure 2:
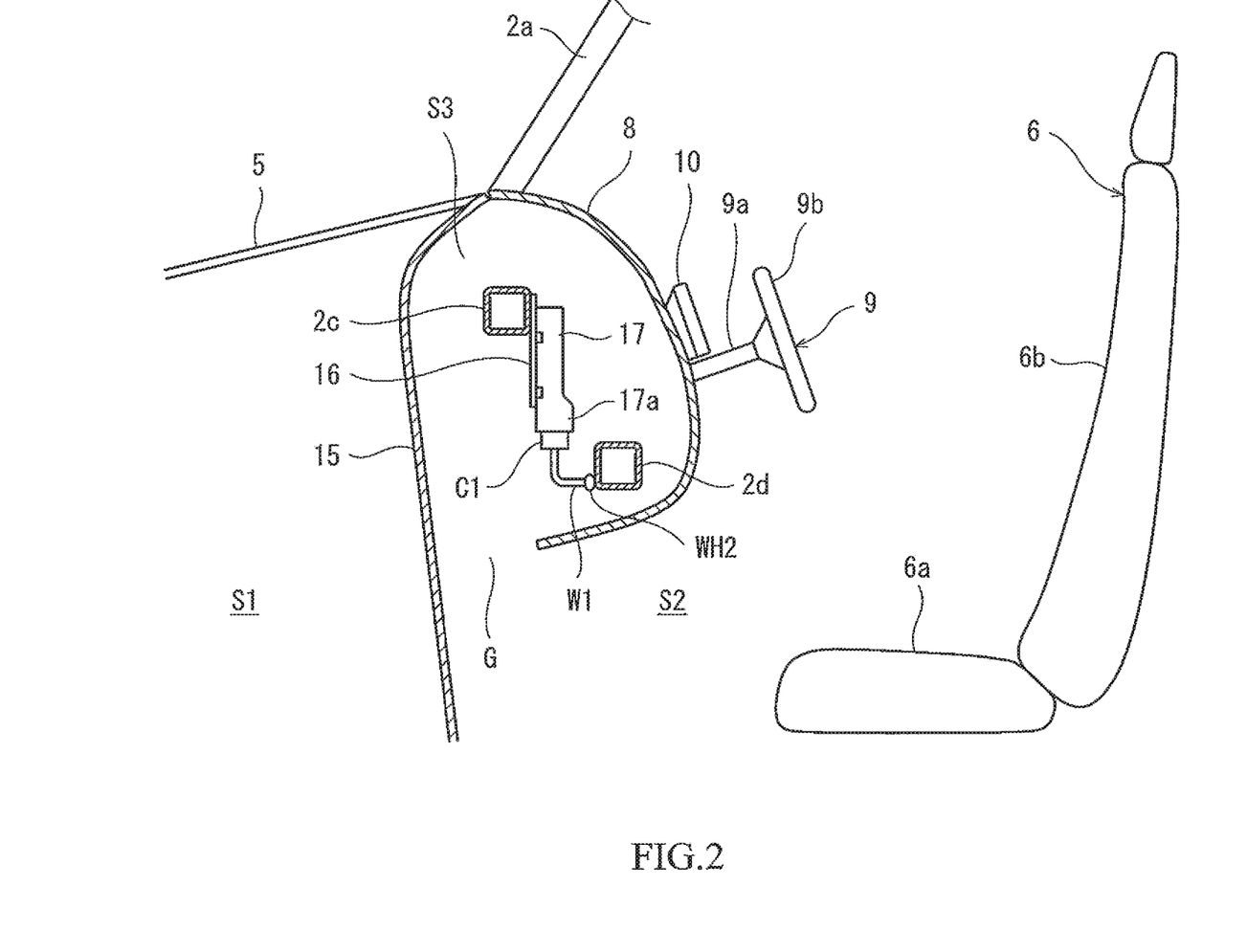
FIG. 2 is a longitudinal cross-sectional view of key components of the utility vehicle shown in FIG. 1, where the key components are seen from the left.

FIG. 2 is a longitudinal cross-sectional view of key components of the utility vehicle 1 shown in FIG. 1, where the key components are seen from the left. As shown in FIG. 2, a front panel 15 is disposed forward of the dash panel 8. The front panel 15 separates a vehicle exterior space 51 lying below the hood 5 (i.e., the space between the pair of front wheels 3) from the vehicle interior space S2 in which the driver seat 6 is disposed. An internal space S3 is formed between the front panel 15 and the dash panel 8. The internal space S3 constitutes a part of the vehicle interior space S2. The lower end of the dash panel 8 is spaced from the front panel 15 by a gap G. Specifically, the gap G is provided between a surface of the front panel 15 that faces the vehicle interior space S2 and lower ends of a driver seat region 8a and a passenger seat region 8c of the dash panel 8. The internal space S3 communicates with a region of the vehicle interior space S2 through the gap G, the region being a region where the driver seat 6 is disposed.

The vehicle body frame 2 includes an upper cross member 2c and a lower cross member 2d which extend in the vehicle width direction (leftward/rightward direction) in the internal space S3 formed between the front panel 15 and the dash panel 8. The upper cross member 2c is located above and forward of the lower cross member 2d. A mounting bracket 16 is secured to the upper cross member 2c. The mounting bracket 16 projects downward from the upper cross member 2c. The mounting bracket 16 is disposed on the rear of the upper cross member 2c.

An electronic control unit 17 (ECU) is detachably secured to the mounting bracket 16 by a fastening member (e.g., a bolt). That is, the electronic control unit 17 is supported by the upper cross member 2c via the mounting bracket 16. The electronic control unit 17 is a controller for controlling the front electronically controlled suspension devices 13 and the rear electronically controlled suspension devices 14. The electronic control unit 17 is disposed such that its upper edge is below the upper edge of the upper cross member 2c. The electronic control unit 17 is disposed such that the thickness direction of the electronic control unit 17 extends in the vehicle front-rear direction. That is, with the electronic control unit 17 secured to the mounting bracket 16, the dimension of the electronic control unit 17 in the vehicle front-rear direction is smaller than the dimensions of the electronic control unit 17 in the vehicle width direction and the vehicle height direction (upward/downward direction).

The electronic control unit 17 as viewed in the vehicle width direction is located between the upper cross member 2c and the lower cross member 2d. That is, the electronic control unit 17 as viewed in the vehicle width direction is located on an imaginary line drawn between the upper cross member 2c and the lower cross member 2d. The electronic control unit 17 is disposed such that when an external physical impact acts on the vehicle, the upper cross member 2c or the lower cross member 2d receives the impact before the electronic control unit 17 both in the vehicle height direction and in the vehicle front-rear direction. In other words, the electronic control unit 17 is protected by the cross members 2c and 2d disposed at different locations in the height direction and front-rear direction.

The electronic control unit 17 is disposed such that a connector portion 17a of the electronic control unit 17 faces downward. A branch line WH2 of a wire harness WH described later is laid on the lower cross member 2d. The branch line WH2 is disposed to extend along the lower cross member 2d and positionally fixed on the lower cross member 2d by a clamp or any other means. The branch line WH2 includes an electric wire W1 electrically connected to the electronic control unit 17.

The branch line WH2 is located below the connector portion 17a of the electronic control unit 17. The electric wire W1 is provided with a connector C1 connectable to the connector portion 17a of the electronic control unit 17. The connector C1 is fitted into the connector portion 17a of the electronic control unit 17 from below. The connector portion 17a of the electronic control unit 17 is disposed so as to be accessible from the driver seat 6-side through the gap G.

The driver seat 6 includes a seat portion 6a configured to support the buttocks of the driver from below and a back portion 6b configured to support the back of the driver sitting on the seat portion 6a from behind. During travel on a bad road, the utility vehicle 1 may be immersed in water due to the presence of a pool of water, and in this case the water level may reach the seat portion 6a of the driver seat 6. In the utility vehicle 1 of the present embodiment, the electronic control unit 17 is located at a higher level than the seat portion 6a of the driver seat 6 and enclosed in the internal space S3 formed between the front panel 15 and the dash panel 8. As such, the electronic control unit 17 is very unlikely to be exposed to water.

Figure 3:
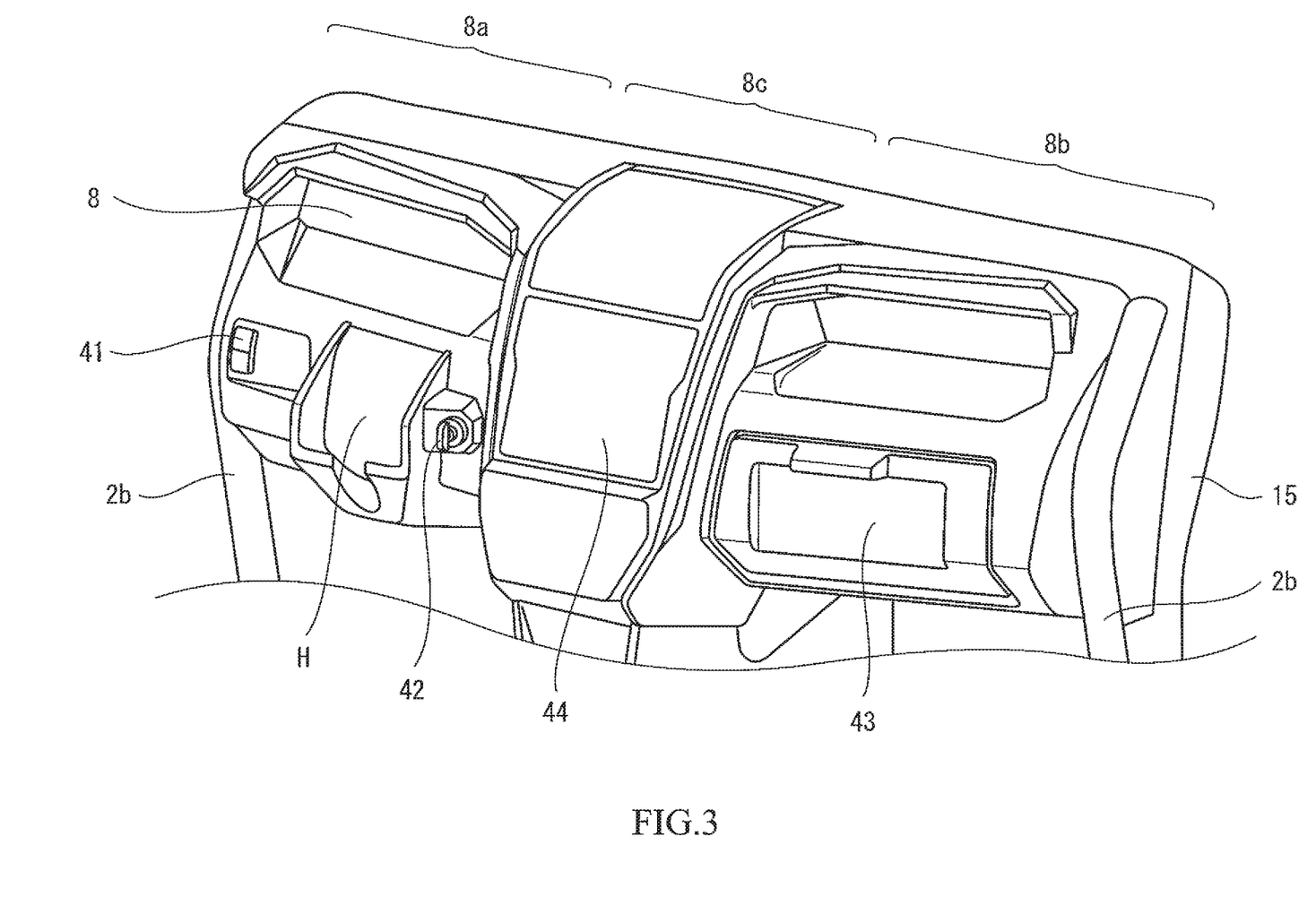
FIG. 3 is a perspective view of a dash panel and its neighboring members of the utility vehicle shown in FIG. 1, where the dash panel and its neighboring members are seen from the right rear.

FIG. 3 is a perspective view of the dash panel 8 and its neighboring members of the utility vehicle 1 shown FIG. 1, where the dash panel 8 and its neighboring members are seen from the right rear. As shown in FIG. 3, the dash panel 8 includes a driver seat region 8a opposed to the driver seat 6, a passenger seat region 8b opposed to the passenger seat 7, and a center region 8c disposed between the driver seat region 8a and the passenger seat region 8b. The driver seat region 8a is provided with a through hole H through which extend the steering shaft 9a of the handle device 9 (see FIG. 2) and a support bracket 18 (see FIG. 5) supporting the display device 10.

The driver seat region 8a is provided with an operating switch 41 operable by the driver, the operating switch 41 being located on one side (e.g., on the left side) of the through hole H in the vehicle width direction. The operating switch 41 is, for example, an input switch electrically connected to the electronic control unit 17 and operable to switch the electronically controlled suspensions between different modes (e.g., a hard mode and a soft mode).

The driver seat region 8a is provided with another operating switch 42 operable by the driver, the operating switch 42 being located on the other side (e.g., on the right side) of the through hole H in the vehicle width direction. The operating switch 42 is, for example, an input switch electrically connected to an engine ECU 51 (see FIG. 6) and operable to start or stop the engine of the power unit 12.

The passenger seat region 8b is provided with a glove box 43. The glove box 43 extends over substantially the entire length of the passenger seat region 8b in the vehicle width direction. As such, there is no significant extra space in a portion of the internal space S3 that is in front of the passenger seat region 8b. The center region 8c is provided with audio equipment 44. Further, a heater device (not illustrated) is disposed in a portion of the internal space S3 that is in front of the center region 8c. As such, there is no significant extra space in the portion of the internal space S3 that is in front of the center region 8c.

Figure 4:
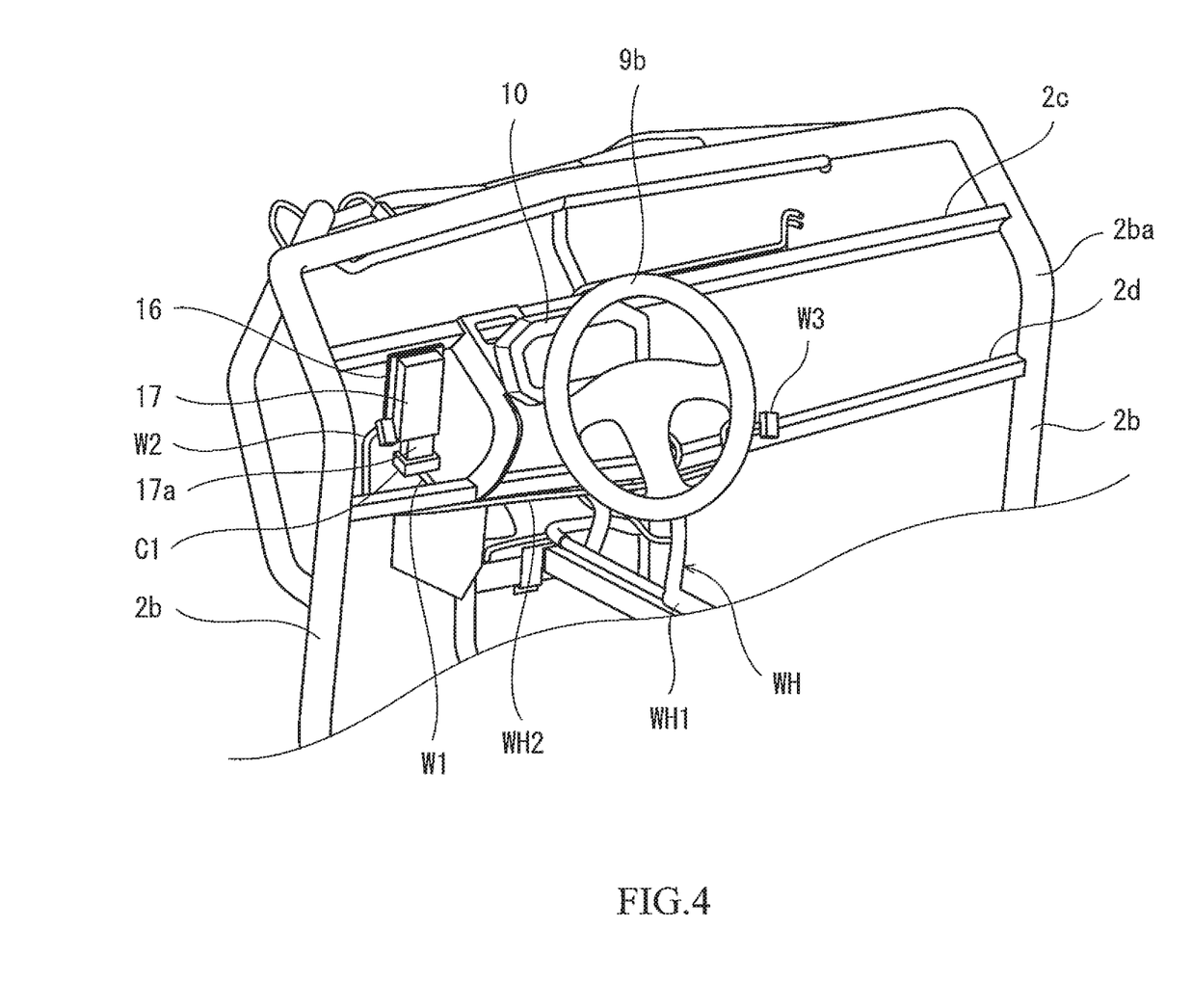
FIG. 4 is a perspective view of an electronic control unit and its neighboring members of the utility vehicle shown in FIG. 1, where the electronic control unit and its neighboring members are seen from the left rear.
Figure 5:
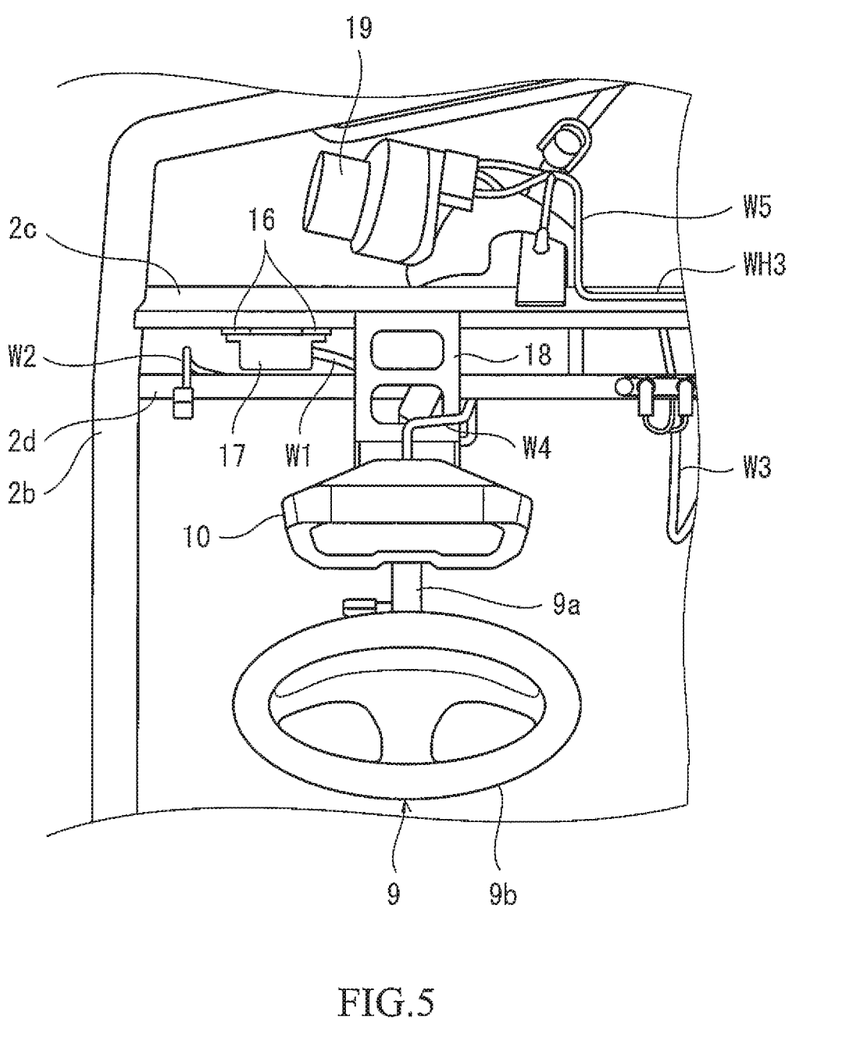
FIG. 5 is a plan view of the electronic control unit shown in FIG. 4 and its vicinity.

FIG. 4 is a perspective view of the electronic control unit 17 and its neighboring members of the utility vehicle 1 shown in FIG. 1, where the electronic control unit 17 and its neighboring members are seen from the left rear. FIG. 5 is a plan view of the electronic control unit 17 shown in FIG.

4 and its vicinity. As shown in FIGS. 4 and 5, the vehicle body frame 2 includes a pair of side frames 2b disposed outward of the driver seat 6 and the passenger seat 7 in the vehicle width direction. Each side frame 2b includes a portion extending in the vehicle height direction, and the portion extending in the height direction has a bend 2ba at which the side frame 2b is bent forward and obliquely upward. The paired side frames 2b are coupled by the upper and lower cross members 2c and 2d extending in the vehicle width direction. The upper cross member 2c is coupled to a portion of each side frame 2b that is above the bend 2ba, and the lower cross member 2d is coupled to a portion of each side frame 2b that is below the bend 2ba. Thus, the upper cross member 2c is located forward of and above the lower cross member 2d. The support bracket 18 is secured to the upper cross member 2c and/or the lower cross member 2d. The display device 10 is secured to the support bracket 18.

In the vehicle width direction, the electronic control unit 17 is located toward the driver seat region 8a with respect to the center region 8c. That is, the electronic control unit 17 is covered from the rear by the driver seat region 8a of the dash panel 8. The electronic control unit 17 is disposed outward (e.g., on the left) of the steering shaft 9a of the handle device 9 in the vehicle width direction. The electronic control unit 17 has a plurality of surfaces and is disposed such that a surface having the largest area among the plurality of surfaces faces in the vehicle front-rear direction.

An electrically assisted power steering device 19 is connected to the steering shaft 9a. The electrically assisted power steering device 19 uses drive power from an electric motor to help the driver operate the handle device 9. The electrically assisted power steering device 19 is disposed in the internal space S3 (see FIG. 2) formed between the dash panel 8 and the front panel 15. The electronic control unit 17 is disposed rearward of and above the electrically assisted power steering device 19.

The wire harness WH includes: a main line WH1 located at the center of the vehicle body frame 2 in the vehicle width direction and extending in the front-rear direction; and branch lines WH2 and WH3 branching from the main line WH1. The branch line WH2 is disposed to extend along the lower cross member 2d on one side (driver seat side) in the vehicle width direction. The branch line WH2 includes an electric wire W1 connected to the electronic control unit 17, an electric wire W2 connected to the operating switch 41, an electric wire W3 connected to the operating switch 42, and an electric wire W4 connected to the display device 10. The branch line WH3 is disposed to extend along the upper cross member 2c. The branch line WH3 includes an electric wire W5 connected to the electrically assisted power steering device 19.

Figure 6:
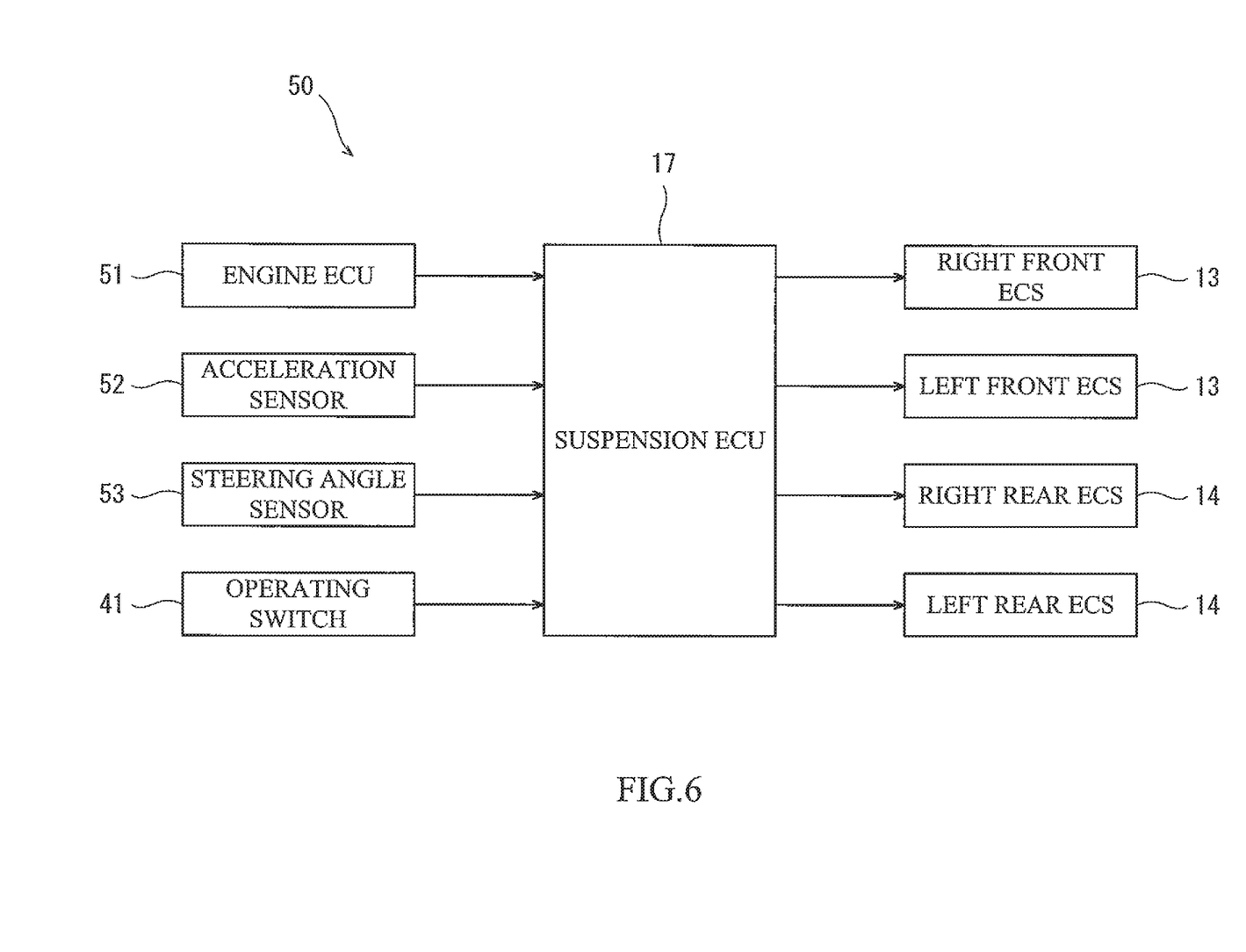
FIG. 6 is a block diagram of an electronically controlled suspension system of the utility vehicle shown in FIG. 1.

FIG. 6 is a block diagram of an electronically controlled suspension system 50 of the utility vehicle 1 shown in FIG. 1. As shown in FIG. 6, the engine ECU 51, an acceleration sensor 52, a steering angle sensor 53, and the operating switch 41 are connected to the input of the electronic control unit 17. To the output of the electronic control unit 17 there are connected the pair of front electronically controlled suspension devices 13 and the pair of rear electronically controlled suspension devices 14. The electronic control unit 17 includes a processor, a volatile memory, a non-volatile memory, and an I/O interface.

The engine ECU 51 receives various information such as the vehicle velocity, gear position, and throttle position in order to control the air intake of the engine, the amount of fuel to be injected, and the timing of ignition. The engine ECU 51 sends the information such as the vehicle velocity, gear position, and throttle position to the electronic control unit 17. The acceleration sensor 52 detects the acceleration of a given portion of the utility vehicle 1 in a given direction. The acceleration sensor 52 is, for example, an inertial measurement unit (IMU) secured to the vehicle body frame 2. The acceleration sensor 52 may be another type of acceleration sensor and may be a stroke sensor that detects the stroke length of each shock absorber. The acceleration sensor 52 need not consist of one acceleration sensor. The steering angle sensor 53 detects the steering angle of the steering shaft 9a of the handle device 9. The electronic control unit 17 controls the front electronically controlled suspension devices 13 and the rear electronically controlled suspension devices 14 according to signals input from the engine ECU 51, the acceleration sensor 52, the steering angle sensor 53, and the operating switch 41.

With the configuration described above, when the utility vehicle 1 traveling on a bad road is immersed in water, the water can be prevented from reaching the electronic control unit 17. At the same time, the occupant can be prevented from feeling discomfort due to heat emitted from the electronic control unit. Additionally, reduction in the flexibility in arranging the accessories (such as the glove box 43, audio equipment 44, and heater device) in the passenger seat region 8b and center region 8c of the dash panel 8 can be prevented. Further, since the electronic control unit 17 is disposed in the internal space S3, the electronic control unit 17 can be protected from splashing mud, flying stones, and the like.

Additionally, since the electronic control unit 17 is disposed such that its thickness direction extends in the vehicle front-rear direction, the distances from the front panel 15 and dash panel 8 to the electronic control unit 17 can be made large. This makes it possible to reduce the likelihood that the front panel 15 or dash panel 8 contacts the electronic control unit 17 when subjected to and deformed by an external impact. Further, since the electronic control unit 17 is disposed outward of the steering shaft 9a in the vehicle width direction, the electronic control unit 17 is located close to the driver seat-side boarding opening P and easily accessible through the driver seat-side boarding opening P. As such, the efficiency of maintenance work on the electronic control unit 17 (such as rewriting of the program and replacement of the whole unit) can be increased.

Additionally, since the electronic control unit 17 is secured to the mounting bracket 16 such that the connector portion 17a faces downward, the connector C1 of the electric wire W1 can easily be fitted into the connector portion 17a of the electronic control unit 17. Further, the branch line WH2 including the electric wire W1 connected to the connector portion 17a of the electronic control unit 17 is laid on the lower cross member 2d, and the connector portion 17a of the electronic control unit 17 is located close to the branch line WH2 laid on the lower cross member 2d. As such, the work of connecting the connector C1 to the connector portion 17a can easily be carried out, and lengthening of the electric wire W1 can be avoided to reduce the number of points where positioning of the electric wire W1 is made.

Additionally, since the operating switch 41 connected to the electronic control unit 17 via the electric wire W2 is disposed in the driver seat region 8a of the dash panel 8, the length of the electric wire W2 for connecting the operating switch 41 to the electronic control unit 17 can be reduced to prevent a weight increase of the wire harness WH. Further, since the electronic control unit 17 is disposed rearward of the electrically assisted power steering device 19 disposed in the internal space S3, the connector portion 17a of the electronic control unit 17 can be accessed from a location below the dash panel 8 without obstruction by the electrically assisted power steering device 19, and the connector C1 of the electric wire W1 can easily be fitted into the connector portion 17a in, for example, maintenance work.

Additionally, since the electronic control unit 17 is disposed at a location as described above in a configuration in which the electronically controlled suspension devices 13 and 14 are provided for all of the front wheels 3 and rear wheels 4, the distances from the electronic control unit 17 to the electronically controlled suspension devices 13 and 14 are small, and the wire harness WH can have a suitable length.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A utility vehicle comprising:
    a pair of front wheels;
    a pair of rear wheels;
    a vehicle body frame supported by the pair of front wheels and the pair of rear wheels;
    a driver seat supported by the vehicle body frame;
    a passenger seat supported by the vehicle body frame;
    a front panel separating a vehicle exterior space formed between the pair of front wheels from a vehicle interior space in which the driver seat and the passenger seat are disposed;
    a dash panel disposed rearward of the front panel and forward of the driver seat and the passenger seat, the dash panel comprising a driver seat region opposed to the driver seat, a passenger seat region opposed to the passenger seat, and a center region disposed between the driver seat region and the passenger seat region;
    a handle device comprising a steering shaft penetrating the driver seat region of the dash panel in a vehicle front-rear direction and a steering wheel connected to a rear end of the steering shaft;
    at least one pair of electronically controlled suspension devices connecting at least the pair of front wheels or the pair of rear wheels to the vehicle body frame; and
    an electronic control unit configured to control the electronically controlled suspension devices, wherein
    the vehicle body frame comprises at least a first cross member and a second cross member extending in a vehicle width direction in an internal space formed between the front panel and the dash panel,
    the electronic control unit is disposed in the internal space formed between the front panel and the dash panel and is located at a higher level than a seat portion of the driver seat,
    in the vehicle width direction, the electronic control unit is located toward the driver seat region with respect to the center region,
    the electronic control unit is secured to the first cross member,
    the electronic control unit projects downward from the first cross member such that a connector portion of the electronic control unit faces downward,
    the connector portion of the electronic control unit connects to a wire harness secured to the second cross member, and
    the electronic control unit is located between the first cross member and second cross member when viewed from the vehicle width direction.

2. The utility vehicle according to claim 1, wherein the electronic control unit is disposed outward of the steering shaft in the vehicle width direction.

3. The utility vehicle according to claim 1, wherein
    the electronic control unit is secured to the first cross member via a bracket.

4. The utility vehicle according to claim 3, wherein
    the first cross member is an upper cross member and the second cross member is a lower cross member,
    the bracket is secured to the upper cross member, and
    the wire harness is laid on the lower cross member, the wire harness comprising an electric wire connected to the connector portion of the electronic control unit.

5. The utility vehicle according to claim 1, further comprising an operating switch connected to the electronic control unit and operable by a driver of the utility vehicle.

6. The utility vehicle according to claim 5, wherein
    the operating switch is connected to the electronic control unit via an electric wire, and
    the operating switch is disposed in the driver seat region of the dash panel.

7. The utility vehicle according to claim 1, further comprising an electrically assisted power steering device disposed in the internal space and connected to the steering shaft, wherein
    the electronic control unit is disposed rearward of the electrically assisted power steering device.

8. The utility vehicle according to claim 1, wherein the at least one pair of electronically controlled suspension devices comprises: a pair of front electronically controlled suspension devices connecting the pair of front wheels to the vehicle body frame; and a pair of rear electronically controlled suspension devices connecting the pair of rear wheels to the vehicle body frame.

9. The utility vehicle according to claim 1, wherein
    the first cross member is located above and forward of the second cross member, and
    the electronic control unit is located below the first cross member.

10. A utility vehicle comprising:
    a pair of front wheels;
    a pair of rear wheels;
    a vehicle body frame supported by the pair of front wheels and the pair of rear wheels;
    a driver seat supported by the vehicle body frame;
    a passenger seat supported by the vehicle body frame;
    a front panel separating a vehicle exterior space formed between the pair of front wheels from a vehicle interior space in which the driver seat and the passenger seat are disposed;
    a dash panel disposed rearward of the front panel and forward of the driver seat and the passenger seat, the dash panel comprising a driver seat region opposed to the driver seat, a passenger seat region opposed to the passenger seat, and a center region disposed between the driver seat region and the passenger seat region;
    a handle device comprising a steering shaft penetrating the driver seat region of the dash panel in a vehicle front-rear direction and a steering wheel connected to a rear end of the steering shaft;

at least one pair of electronically controlled suspension devices connecting at least the pair of front wheels or the pair of rear wheels to the vehicle body frame; and an electronic control unit configured to control the electronically controlled suspension devices, wherein the vehicle body frame comprises at least a first cross member and a second cross member extending in a vehicle width direction in an internal space formed between the front panel and the dash panel, the electronic control unit is disposed in the internal space formed between the front panel and the dash panel, the electronic control unit is disposed such that a thickness direction of the electronic control unit extends in the vehicle front-rear direction, a dimension of the electronic control unit in the vehicle front-rear direction is smaller than dimensions of the electronic control unit in the vehicle width direction and a vehicle height direction, the electronic control unit is secured to the first cross member, the electronic control unit projects downward from the first cross member such that a connector portion of the electronic control unit faces downward, the connector portion of the electronic control unit connects to a wire harness secured to the second cross member, and the electronic control unit is located between the first cross member and second cross member when viewed from the vehicle width direction.

11. A utility vehicle comprising:
a pair of front wheels;
a pair of rear wheels;
a vehicle body frame supported by the pair of front wheels and the pair of rear wheels;
a driver seat supported by the vehicle body frame;
a passenger seat supported by the vehicle body frame;
a front panel separating a vehicle exterior space formed between the pair of front wheels from a vehicle interior space in which the driver seat and the passenger seat are disposed;
a dash panel disposed rearward of the front panel and forward of the driver seat and the passenger seat, the dash panel comprising a driver seat region opposed to the driver seat, a passenger seat region opposed to the passenger seat, and a center region disposed between the driver seat region and the passenger seat region;
a handle device comprising a steering shaft penetrating the driver seat region of the dash panel in a vehicle front-rear direction and a steering wheel connected to a rear end of the steering shaft;
at least one pair of electronically controlled suspension devices connecting at least the pair of front wheels or the pair of rear wheels to the vehicle body frame; and
an electronic control unit configured to control the electronically controlled suspension devices, wherein
the vehicle body frame comprises at least a first cross member and a second cross member extending in a vehicle width direction in an internal space formed between the front panel and the dash panel,
the electronic control unit is disposed in the internal space formed between the front panel and the dash panel and is located at a higher level than a seat portion of the driver seat,
in the vehicle width direction, the electronic control unit is located toward the driver seat region with respect to the center region,
the electronic control unit is secured to the first cross member via a bracket,
the bracket is secured to the first cross member such that the bracket projects downward from the first cross member,
the electronic control unit is secured to the bracket such that a connector portion of the electronic control unit faces downward,
a gap is provided at a lower end of the dash panel, and
the connector portion of the electronic control unit is disposed on a side of the electronic control unit that is accessible through the gap.

* * * * *